United States Patent [19]

Kobayashi et al.

[11] Patent Number: 5,431,530
[45] Date of Patent: Jul. 11, 1995

[54] APPARATUS FOR TRANSFERRING AND STOCKING LEAD PLATES FOR STORAGE BATTERIES

[75] Inventors: Masaru Kobayashi, Toyohashi; Kiyohiko Kawakami, Kosai; Kunihiro Suzuki, Shizuoka; Katsuhiro Takahashi; Kenzo Yamamoto, both of Toyohashi, all of Japan

[73] Assignee: Matsushita Electric Industrial Co., Ltd., Osaka, Japan

[21] Appl. No.: 80,088

[22] Filed: Jun. 21, 1993

Related U.S. Application Data

[63] Continuation-in-part of Ser. No. 850,492, Mar. 13, 1992, abandoned.

[51] Int. Cl.⁶ .................. B65G 57/09; B65G 31/00
[52] U.S. Cl. .......................... 414/794.4; 198/641; 414/789.1; 414/798.5
[58] Field of Search .............. 414/794.4, 794.1, 788.9, 414/793.4, 789.1, 790, 790.1, 790.8, 608–610; 198/624, 641, 642; 271/202, 217, 218, 221, 224

[56] References Cited

U.S. PATENT DOCUMENTS

| | | | |
|---|---|---|---|
| 2,406,489 | 8/1946 | Case | 414/794.4 |
| 3,231,100 | 1/1966 | Faeber | 414/790 |
| 3,430,784 | 3/1969 | Hall | 414/789.1 |
| 4,346,882 | 8/1982 | Pessina et al. | 414/789.1 |
| 4,538,511 | 9/1985 | Wise | 414/794.4 |
| 4,934,687 | 6/1990 | Hayden et al. | 414/794.4 |
| 4,978,000 | 12/1990 | Mohr | 198/641 |
| 5,006,040 | 4/1991 | Frey | 414/794.4 |
| 5,137,415 | 8/1992 | Doeberl et al. | 414/798.5 |
| 5,160,129 | 11/1992 | Siriporn et al. | 414/789.1 |

FOREIGN PATENT DOCUMENTS

| | | |
|---|---|---|
| 0327208 | 8/1989 | European Pat. Off. |
| 0402349 | 12/1990 | European Pat. Off. |
| 0402350 | 12/1990 | European Pat. Off. |
| 2705509 | 8/1978 | Germany ............ 414/794.4 |

*Primary Examiner*—Michael S. Huppert
*Assistant Examiner*—R. B. Johnson
*Attorney, Agent, or Firm*—Stevens, Davis, Miller & Mosher

[57] ABSTRACT

A plate stacking and transferring apparatus includes plate stacking mechanism for continuously stacking plates. The mechanism comprises: a pair of rollers provided at the leading end of a conveyor for transporting pasted plates, for taking a plate in a gap therebetween while rotating and thus ejecting the plate, and adjusting the plate ejection angle; a collision wall for limiting the flight distance of plates; a first stacker table for receiving plates while descending; a device for registering plates stacked on the first table by repeatedly pushing the plates from the sides thereof; and a second stacker table provided below the first table. When the first table has passed the stack of plates over to the second table, another device of the stacking mechanism moves the first table to a standby position above the plate flight region, keeps it at the position, and moves it down to a position below the plate flight region during a shot so that the first table takes over the plate stacking. The apparatus also includes a transferring mechanism which comprises stays that are movable up and down, and a flat board having holes for receiving the stays. The mechanism transfers stacks of plates from the stays to the flat board at one time, and from the flat board to the stays by the reverse operation, thereby facilitating transportation of the stacks of plates for the next operation.

4 Claims, 6 Drawing Sheets

APPARATUS FOR TRANSFERRING AND STOCKING LEAD PLATES FOR STORAGE BATTERIES

CROSS REFERENCE TO RELATED APPLICATION

This is a continuation in part of patent application Ser. No. 07/850,492 filed on Mar. 13, 1992 now abandoned.

BACKGROUND OF THE INVENTION

1. Field of the Invention

The present invention relates to a method of stacking and transferring plates for a lead storage battery, and an apparatus for use in the method.

2. Description of the Related Art

Plates for lead storage batteries are generally produced by the pasting method. In a well-known type of pasting method, a paste-like active material is applied onto a cast grid, the surface of the grid is simply flash-dried, and a plurality of such grids are stacked and dried by aging in an aging room. Recently, there has been much progress in enhancing the productivity of such pasted plates. The productivity of the pasted plates has been greatly improved with development of various methods, for example: the expanding method which forms a continuously reticulated frame by expanding a continuous sheet of a lead alloy, applies paste continuously to the frame, cuts the frame into plates and flash-dries the plates; and the continuous casting method which applies paste to a continuously cast grid. On the other hand, handling of plates produced successively at a high rate leaves much room for improvement. Actually, the plates individually separated after being pasted and flash-dried are manually gathered at the end of the conveyor and arranged on a pallet. Such a manual operation is inefficient, and during the manual operation, many plates are damaged or degraded by mishandling, e.g., dropping plates, and, further, workers may be injured in accidents. Thus, the manually operated process spoils the effect of the improvement made in the previous process. The mechanization of this process has been slow because the plates in this process are difficult to handle by a machine. Plates flash-dried are still soft before being dried by aging and, therefore, liable to deformation. A plate formed by the expanding method is particularly difficult to handle because the cut end portions of the plate are fragile because of its structure.

To mechanize the process of stacking and transferring such plates, various methods have been developed, for example: a method in which a plate is picked up from a belt conveyor by a belt with a sucker rotating above the belt conveyor, and released from the sucker in such a predetermined position that the released plate falls on another plate; a method disclosed in, e.g., U.S. Pat. No. 5,006,040, which uses a pair of ejection rollers to eject plates down to a belt conveyor in order to stack plates; and a method for stacking printed sheets disclosed in U.S. Pat. No. 4,934,687 in which a stacker table for receiving printed sheets is thrust out from under a pair of flying rollers. The last-mentioned method is applicable to plates. However, these methods have problems. The first-mentioned method fails to achieve constant operation due to, for example, mis-suction and mis-release from the sucker device. The second and third methods need to adjust the speed of the flying rollers or thrust the stacker table out at a high speed in order to continuously stack plates, because of the operation in which after a plate is dropped, the conveyor or the stacker table is operated. Therefore, as the transport speed of the plates is increased, the drop positions of the plates vary more significantly, resulting in more damaged plates, more accidents causing the apparatus to stop, and less precisely-registered stacking of plates, which makes it more likely that plates will fall off during the transportation of the plates for the next process. Further, many stacks of plates are collectively handled, mainly by hand, to transfer them onto a large flat board. Thus, it is necessary to develop a method and apparatus for both stacking and transferring of plates which achieves constant and continuous operation and precise register of a stack of plates, thus facilitating high-speed mass production of lead storage batteries.

SUMMARY OF THE INVENTION

An object of the present invention is to provide a method and apparatus for automatically and stably performing the process of stacking and transferring soft and fragile pasted plates so as to rationalize the process in accordance with recently improved production speed of pasted plates, and unfailingly achieve high quality of the plates as the products.

To achieve the above objects, the basic features of the present invention will be described. Most effective modes for carrying out the invention will be described later with reference to the embodiments.

The basic features of the plate stacking and transferring apparatus of the present invention are: a plate ejecting mechanism for ejecting plates from a high-speed belt conveyor down to a predetermined position in a good posture; a device provided at the leading end of the belt conveyor for adjusting the plate ejection angle; and a device for receiving and stacking plates. To achieve well-balanced operation of these mechanisms and devices, the present invention employs the following component mechanisms.

A first stacker table for stacking plates has a mechanism for lowering the position of the first stacker table during a short time interval between one plate and the following plate ejected from the plate ejecting mechanism so that the first stacker table takes over the plate stacking. More specifically, the first stacker table comprises: a mechanism for keeping a stacker base of the first stacker table at a standby position a little above the plate flight line, and for moving the stacker base down to a position below the plate flight line at a predetermined timing so that the first stacker table takes over the plate stacking, and for lowering the stacker base in accordance with the amount of the plates stacked thereon; a register mechanism including a collision wall provided on the extension of the plate flight line, and a plate register device for registering the plates stacked on the stacker base by repeatedly pushing horizontally at least a portion of the sides of the stacked plates. A second stacker table receives a stack of plates from the first stacker table, continues stacking plates, and transfers the stack of plates for the next process. A transfer mechanism comprises: stays for supporting stacks of plates, the stays having vertically driving means; and a flat board having holes for receiving the stays therein. The transfer mechanism transfers a plurality of stacks of plates from the stays collectively onto a flat board at one time, thus making a group of stacks of plates on the flat board. The transfer mechanism also transfers the stacks of plates from the flat board onto stays by the reverse operation, thus separating the group into individual stacks of plates. These mechanisms are very effective for a high-speed plate stacking and transferring apparatus and method.

The effects and operations of the above element mechanisms will now be described.

First, the plate eject angle adjusting device is located at the leading end of a belt conveyor on which plates are transported at a high speed. The device may be provided in various forms. The device determines the flight distance and landing posture of the plates and, unlike the conventional suction method, makes no landing errors. The flight distance and landing posture of plates can be achieved by, for example, setting the plate ejection angle and a desirable frictional resistance by using a shooter. An effective method of adjusting the plate ejection angle utilizes the engagement of a pair of rollers. Thereby, the plates can be ejected so as to accurately land in a proper posture to a predetermined position. The speed of the plate in the direction of the plate flight line is preferably reduced, thereby reducing accidents where a plate collides with the wall or the like and is damaged.

The stacker table has a mechanism for descending while receiving and stacking plates near the drop point of the plates. In order to continue the operation of stacking plates after the stacker table has stacked a predetermined amount of plates, there must be provided another stacker table which stands by above or beside the plate drop point and replaces the stacker table during the high-speed plate ejection (one shot). The mechanism for keeping the stacker base of the first stacker table at a standby position a little above the plate flight line, unfailingly receives plates regardless of the sizes of plates, as long as the stacker table is quickly moved down from the standby position to a position below the plate flight line and continues descending so that the top surface of the stack of plates thereon is always below the plate flight line. In another example of a method for continuing the plate stacking operation, a stacker table is horizontally thrust out under the plate flight line to receive a plate. However, because the stacker table moves over a rather long travel distance and thus requires a rather long travel time, this method is likely to cause plate receiving failures in high-speed plate stacking. More specifically, in a high-speed plate stacking operation at an ejection rate of 100 plates or more per minute, there are increased numbers of plate receiving failures, for example, where a flying plate collides with the stacker base of the stacker table. On the other hand, the above-mentioned mechanism for keeping the first stacker table at the standby position a little above the plate flight line and quickly moving it down to take over the plate reception is able to unfailingly achieve smooth switching of stacker tables even at a very fast ejection rate, for example, 250 plate per minute.

The plate stacking operation can be continued by the combination of the first stacker table and the second stacker table by the following operation. As the first stacker table descends while receiving plates, it passes the stack of plates over to the second stacking plate. Then, the first stacker table is returned to the standby position before the stack of plates on the second stacker table mounts to a predetermined number of plates. By repeating this operation, the plate stacking can be continued without interruption or accidents.

Although this method which ejects the plates can stack the plates in the same position with a significant accuracy, the position may shift. Therefore, it is important to register the stacked plates in order to prevent the plates from falling off during the plate stacking operation and to meet the plate aging conditions. However, because these plates are easily deformable and therefore hard to move once they are stacked, a register device must frequently push the plates against their sides to register them while they are being stacked on one another. Because the register mechanism allows for a comparatively large landing space of each stacker table, plate stacking errors are reduced and a stack of plates can be easily and unfailingly registered. Then, stacks of plates are sequentially transferred to the next transport line. However, considering the space efficiency in the following plate aging process, it is preferable to collectively handle many stacks of plates by, for example, placing stacks of plates on a flat board to transport them. Such a flat board is provided with holes, and is set so that the holes receive stays for supporting stacks of plates, with the stacks protruding from the holes. Stacks of plates are transferred onto the stays by transfer means, for example, a fork. Then, the stays are lowered from the flat board. Thus, stacks of soft plates can be collectively transferred onto the flat board without being damaged.

After aging, the stacks of plates can be transferred onto the stays by the reverse operation, thus facilitating individually handling the stacks of plates.

The component mechanisms are individually effective in handling fragile pasted plates, and a combination of the mechanisms functions as a high-speed plate stacking and transferring apparatus which is well-balanced.

DESCRIPTION OF THE PREFERRED EMBODIMENTS

The preferred embodiments of the present embodiments will be described hereinafter with reference to the accompanying drawings.

Figure 1:
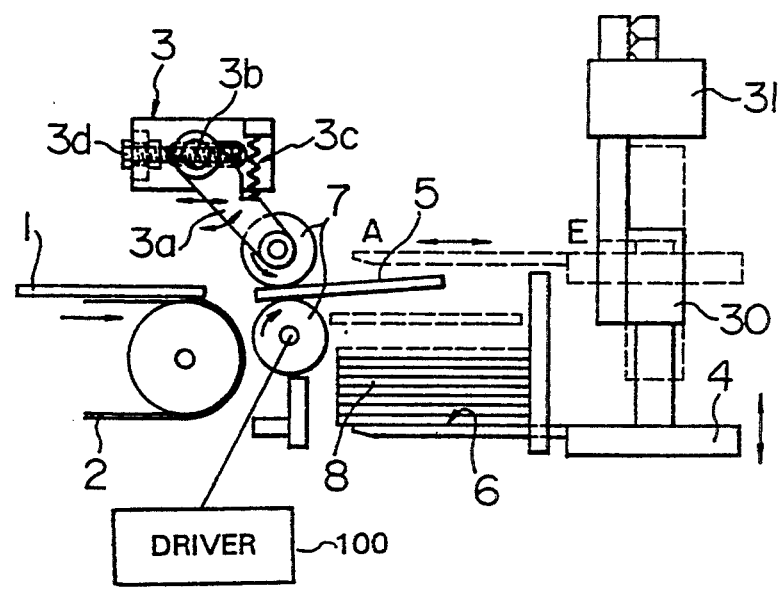
FIG. 1 is a view of a plate eject angle adjusting device according to the present invention.
Figure 2:
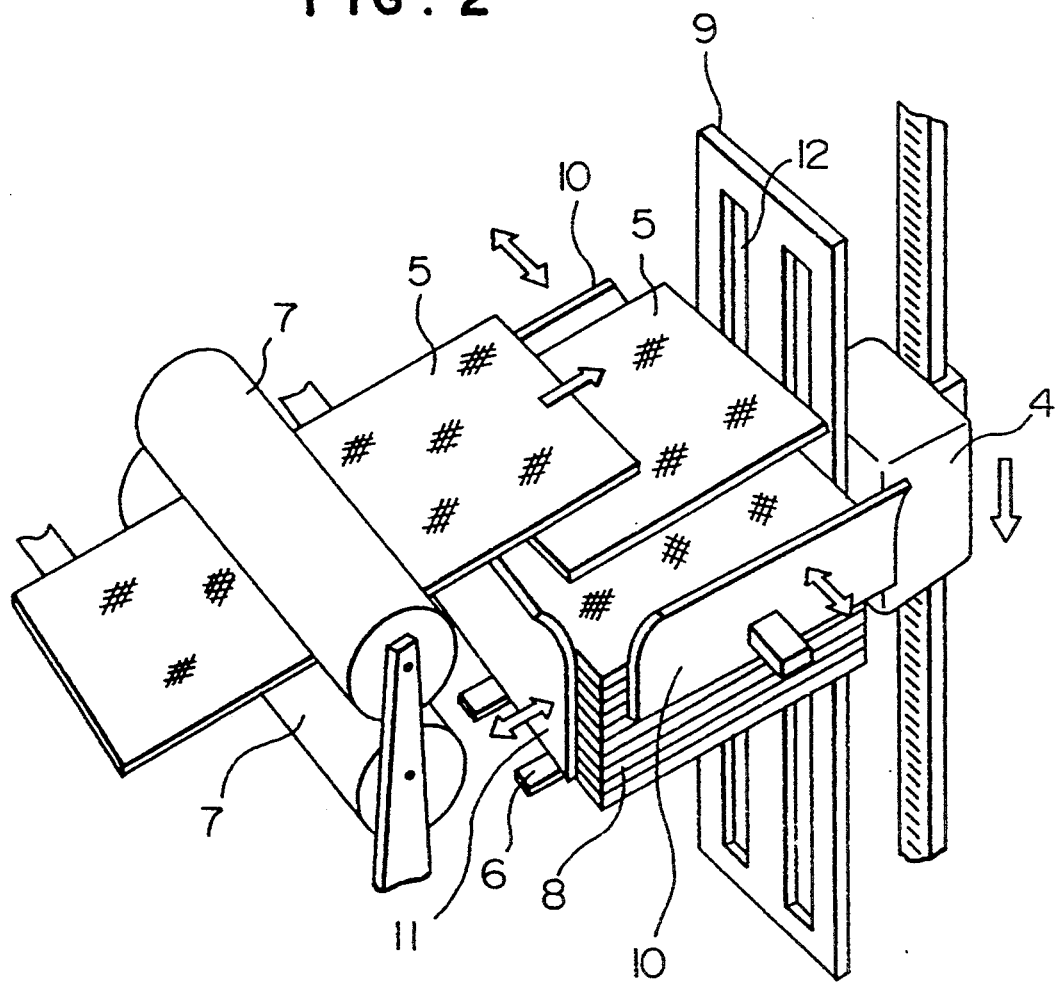
FIG. 2 illustrates a registering mechanism for a stack of plates according to the present invention.

FIG. 1 illustrates a plate eject angle adjusting device of the plate stacking and transferring apparatus of the present invention. The plate eject angle adjusting device adjusts the ejection angle of plates which have been transported thereto by a conveyor. FIG. 1 shows:

a plate 1 being transported on a high-speed belt conveyor 2; a plate ejection angle adjusting device 3 provided at the end of the belt conveyor 2; and a first stacker table 4 for stacking plates. A plate 5 glides down from the plate ejection angle adjusting device 3 onto a stacker base 6 of the stacker table 4, and the stacker table 4 is lowered by a pusher 30 in accordance with the number of plates stacked on thereon. In this embodiment, the plate ejection angle adjusting device 3 comprises: a pair of upper and lower rollers 7; an arm 3a for supporting the upper roller 7 so that the upper roller 7 is movable; a supporting point 3b of the arm 3a; a spring 3c for applying an appropriate amount of force to the arm 3a; and an adjust screw 3d for shifting the upper roller 7 backward and forward. Thus, the plate ejection angle can be easily adjusted by shifting the upper roller 7. If necessary, both or either one of the rollers 7 may be provided with pressuring force and/or rotational driving force in the plate eject direction. For example, lower roller 7 may be driven by a conventional driving device 100. FIG. 1 further shows a group of plates 8 stacked on the stacker base 6. FIG. 2 illustrates a plate register mechanism in the plate stacking and transferring apparatus of the present invention. A collision wall 9 is provided on a flight line of the plate 5 so as to stop the plate 5 ejected from the rollers 7. The collision wall 9 is provided separately from the first stacker table 4. The distance between the top surface of a stack of plates and the bottom edge of the collision wall 9 is preferably as short as possible in order to minimize the resistance or friction against the descent of the stack of plates 6. Register devices 11 and 10 repeatedly push the stack of plates 8 on the front side opposite the collision wall 9 and the other two sides (the right and left sides) of the stack of the plates 8, respectively. A top portion of each of the register devices 11 and 10 is curved so as to avoid disturbing the alignment of the stack of plates 8. Particularly, the top portions of the right and left-side register devices 10 are preferably curved outward so as to increase the space therebetween, thus ensuring that the plates 5 will fall therebetween and land onto the stacker base 6.

Figure 3:
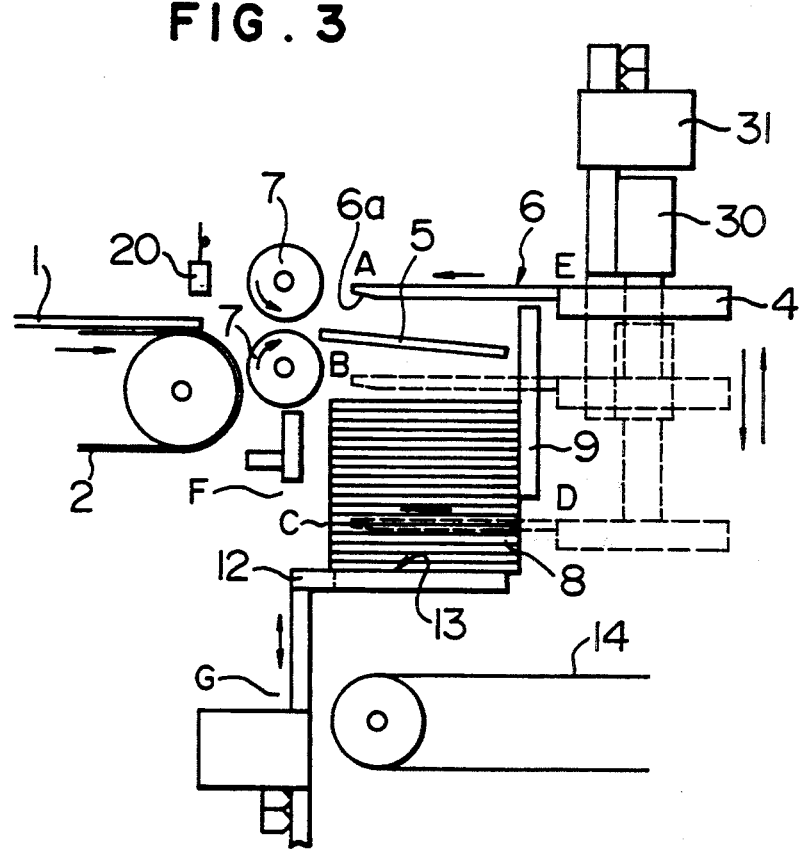
FIG. 3 illustrates a mechanism for a standby takeover mechanism for a stacker table according to the present invention.

FIG. 3 illustrates a mechanism of the plate stacking and transferring apparatus of the present invention, for keeping the first stacker table 4 on standby, stacking plates, and passing a stack of plates over to the second stacker table.

Figure 5:
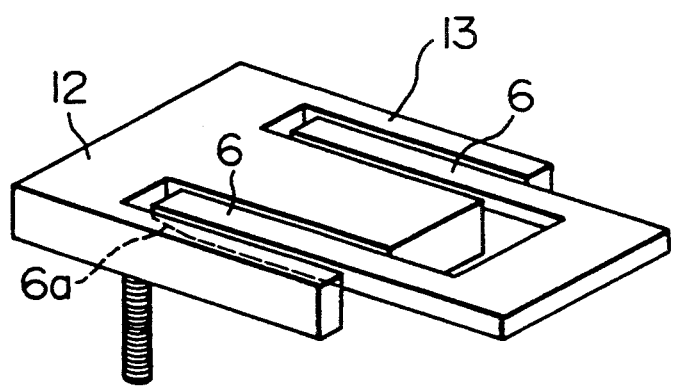
FIG. 5 illustrates a mechanism for transferring a stack of plates from a first stacker table to a second stacker table while plates are being stacked on one another.

The stacker base 6 of the first stacker table 4 is held at a standby position A a little over the flight line of the plate 5 from the pair of rollers 7. When the stacker base 13 of the second stacker table 12 has received a predetermined number of plates, the first stacker table 4 is instantly moved down to a position B under the plate flight line by the pusher 30 and receives the next coming plate 1. After that, the first stacker table 4 is gradually lowered by means of a lifter 31 so as to maintain the plate landing position at substantially the same level. When the first stacker table 4 has continuously received plates and descended to a predetermined position D, the first stacker table 4 passes the stack of the plates 8 over to the stacker base 13 of the second stacker table 12. The stacker bases 6, 13 of the first and second stacker tables 4, 12 have fork-like shapes that match each other as shown in FIG. 5. A sensor 20 detects a predetermined number of plates. The pusher 3 is preferably driven by an air cylinder in order to achieve high speed operation. A taper portion 6a is formed on the front lower edge of the stacker base 6 of the first stacker table 4 (shown in FIG. 5) and facilitates positioning the stacker base 6 as close to the plate flight line as possible, without interfering with a plate ejected from the rollers 7, when the first stacker table 4 is kept on standby. Thereby, the first stacker table 4 can be lowered to the position B in plenty of time for receiving the coming plate 1. In the above construction, plates transferred and ejected at a high speed can be smoothly and precisely stacked by a method in which the first stacker table 4 is kept on standby and takes over the second stacker table to receive plates.

A series of steps in which the first stacker table is kept at the standby position and then takes over plate reception from the second stacker table while plates are being sequentially stacked will be described with reference to FIGS. 4A to 4E.

Figure 4A:
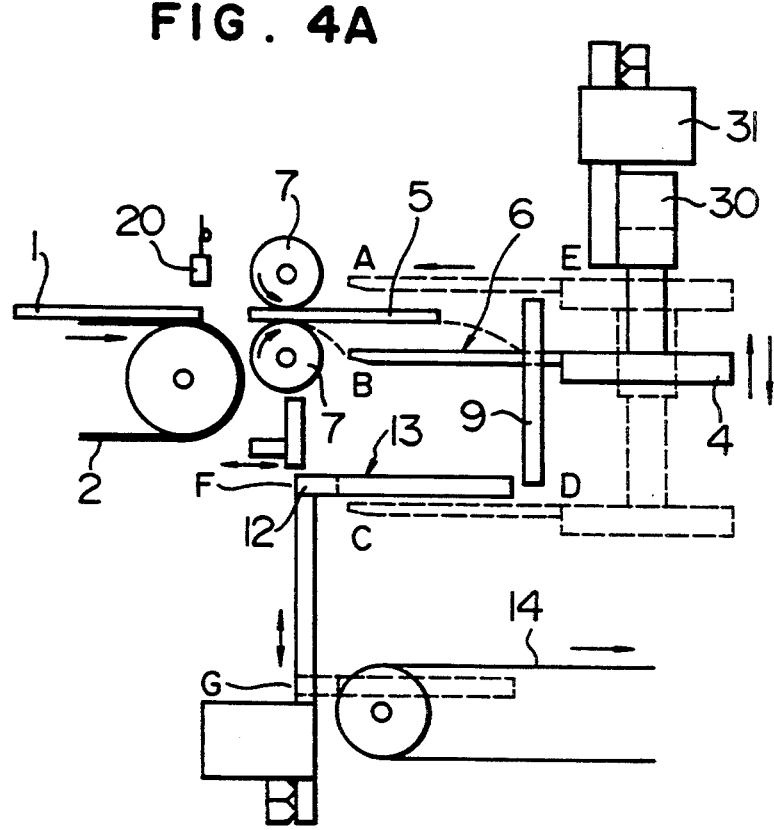
FIGS. 4A to 4E illustrate a series of steps in which, while plates are being stacked, a stack of plates are transferred from a stacker table, and another stacker table for the next stack of plates is kept on standby.

First, as shown in FIG. 4A, the stacker base 6 of the first stacker table 4 is shifted down from the standby position A to the position B under the plate flight line and starts receiving plates 5 ejected from the rollers 7.

Figure 4B:
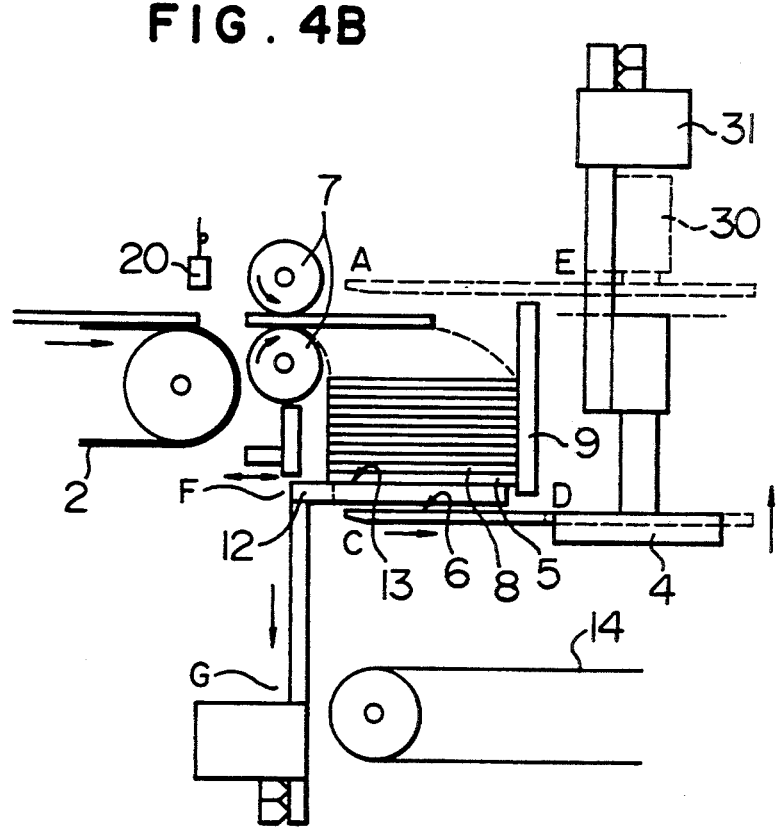

Second, as shown in FIG. 4B, while the stacker base 6 of the first stacker table 4 receives plates sequentially ejected from the rollers 7, the stacker base 6 gradually descends to the predetermined position C. Before reaching the position C, the fork-shaped stacker base 6 meets the fork-shaped stacker base 13 of the second stacker table 12 (as shown in FIG. 5), thus passing the stack of plates 8 over to the stacker base 13 of the second stacker table 12.

Figure 4C:
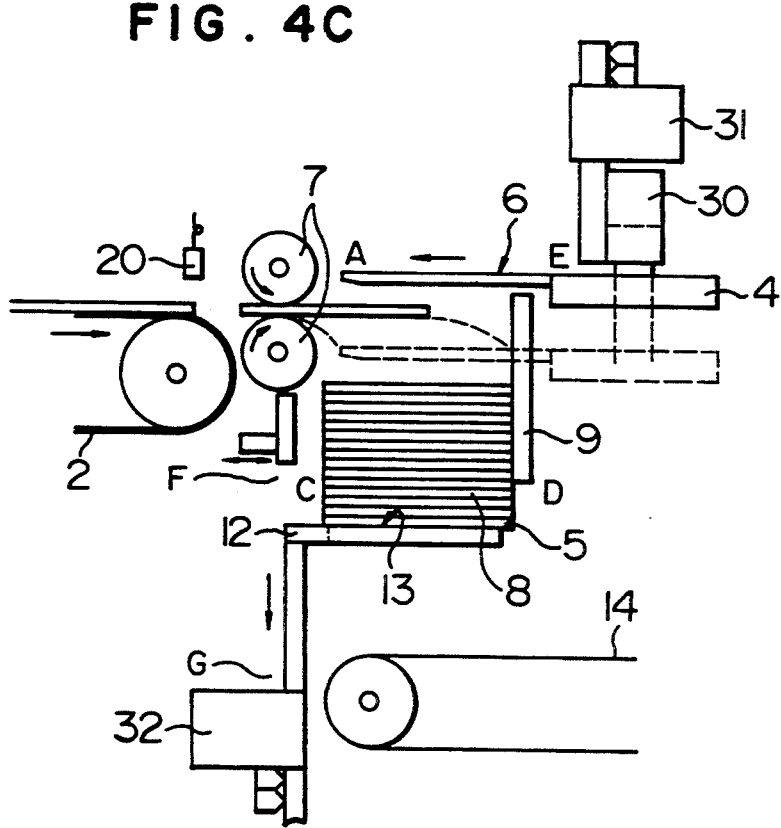

Third, as shown in FIG. 4C, the first stacker table 4 is moved back from the position C shown in FIG. 4B so that the stacker base 6 will not interfere with the stack of plates 8 on the second stacker table 12 which keeps descending. Then, the first stacker table 4 is lifted by the lifter 31 to a position a little above the plate flight line and moved forward in the direction indicated by an arrow to the standby position A.

Figure 4D:
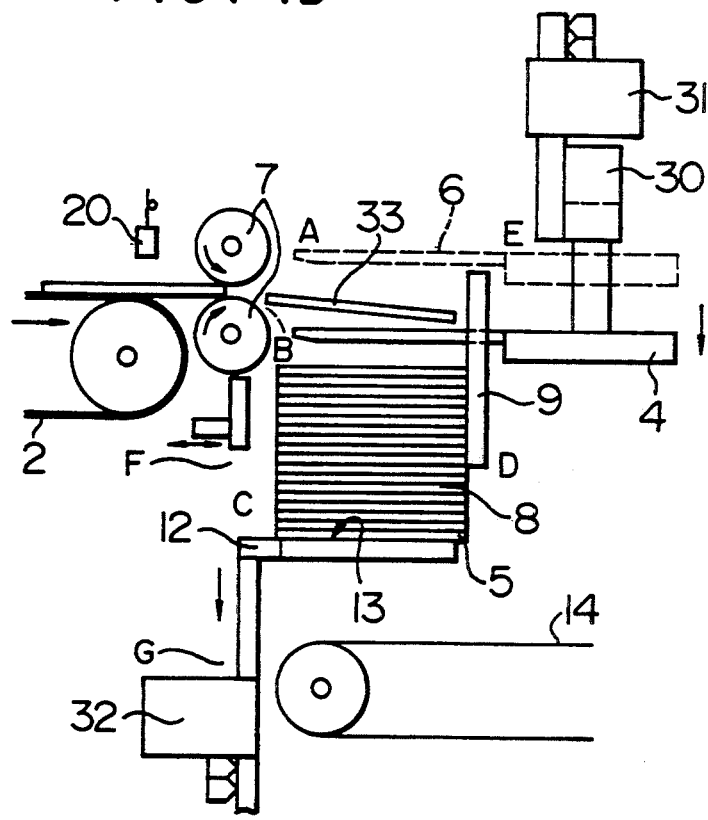

Fourth, as shown in FIG. 4D, when the stack of plates 8 on the second stacker table 12 has mounted to a predetermined number, the first stacker table 4 descends from the standby position A to receive the coming plate 33.

Figure 4E:
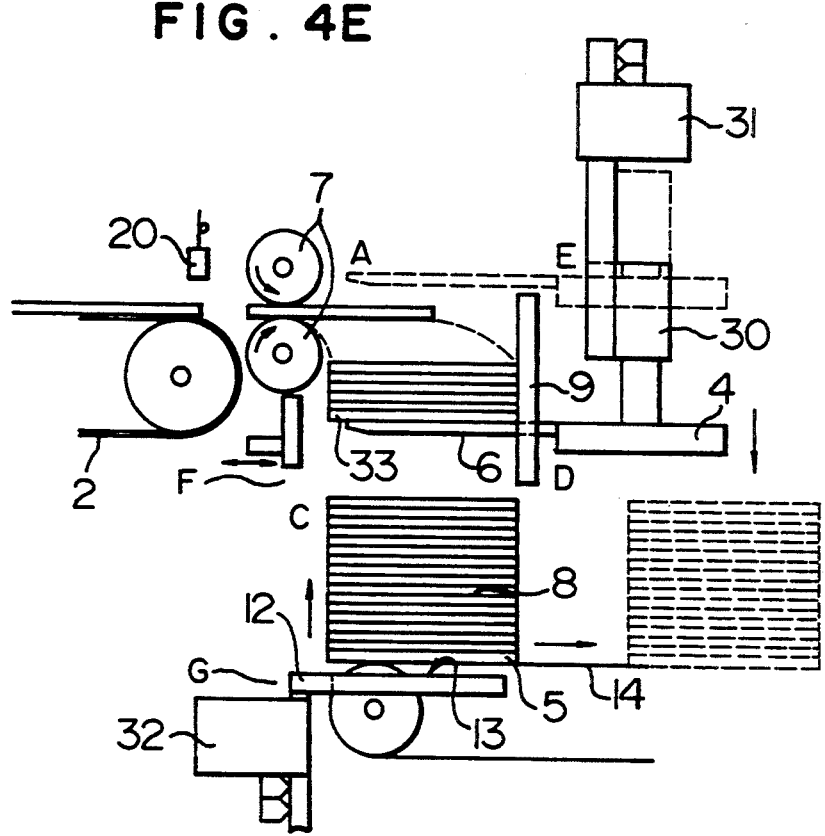

Fifth, as shown in FIG. 4E, when the replacement of the second stacker table 12 by the first stacker table 4 is completed, the second stacker table 12 gradually descends to transfer the stack of plates 8 to a belt or chain conveyor 14. After the stack of plates 8 is transported away (indicated by broken lines), the second stacker table 12 ascends to the predetermined position C to stand by for a stack of plates which will be passed over from the first stacker table 4. These steps are repeated to continuously perform the plate stacking operation.

Figure 6:
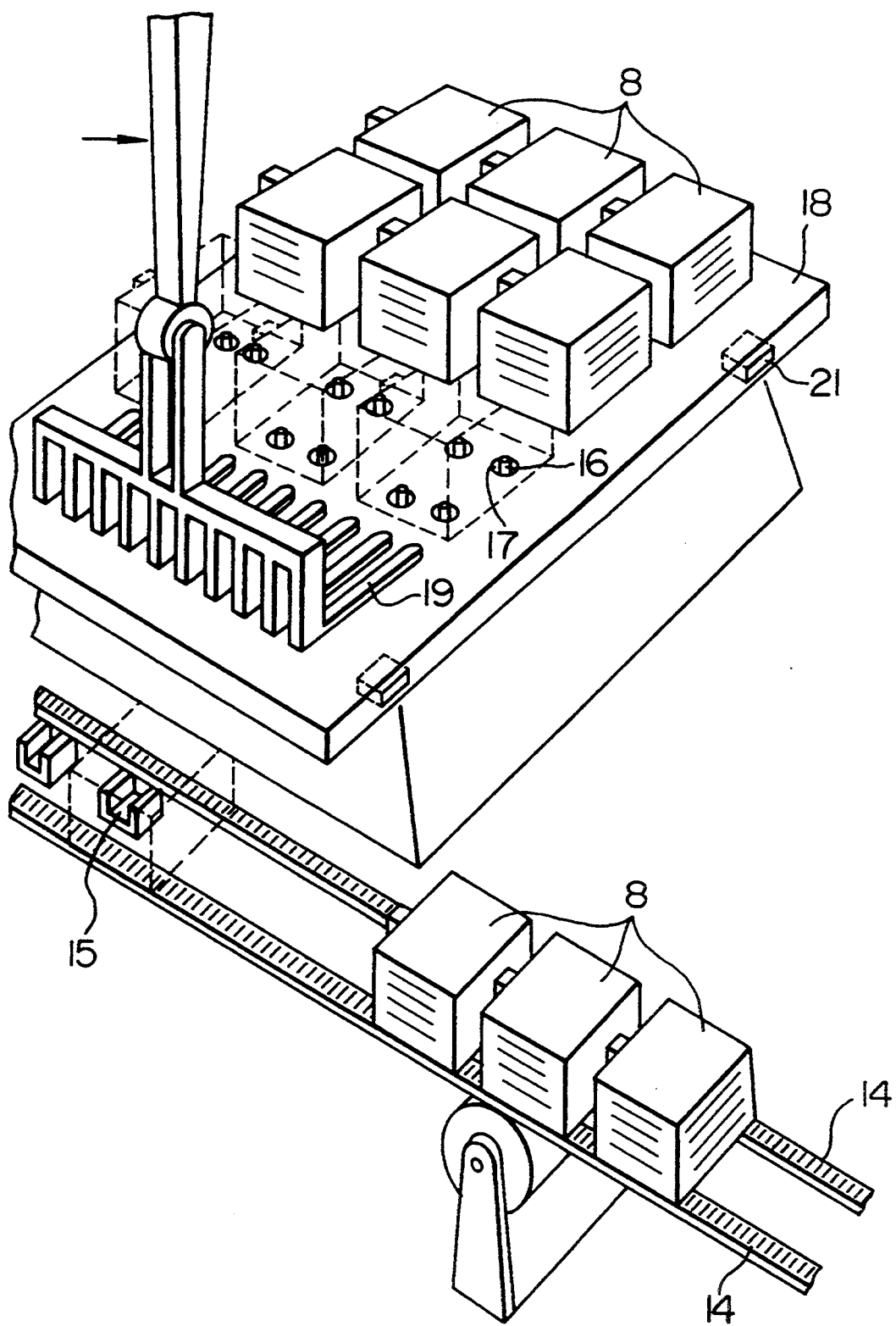
FIG. 6 illustrates an embodiment of a mechanism for transferring a plurality of stacks of plates altogether from the single transport conveyor onto a flat board (pallet) and/or returning the plates to the single transport conveyor.

FIG. 6 illustrates an embodiment of a transferring mechanism for transferring stacks of plates 8 together from the conveyor 14 onto a flat board 18. Basically, the transferring mechanism is composed of: a plurality of stays 16 for supporting stacks of plates 8 on their tops, the stays 16 having ascending and descending means; and the flat board 18 having a plurality of holes 17 each of which has a stay 16 fitted therein. Stacks of plates 8 are raised from the conveyor 14 by a push-up tool 15, and transferred onto the stays 16 projected from the holes 17 of the flat board 18 by a transfer means, that is, a fork 19. Subsequently, the stays 16 are lowered, thus completing the transfer of the stacks of plates 8 from the conveyor 14 onto the flat board 18.

The collective handling of stacks of plates on the flat board can be switched to individual handling simply by performing an operation opposite to the above operation.

Figure 7:
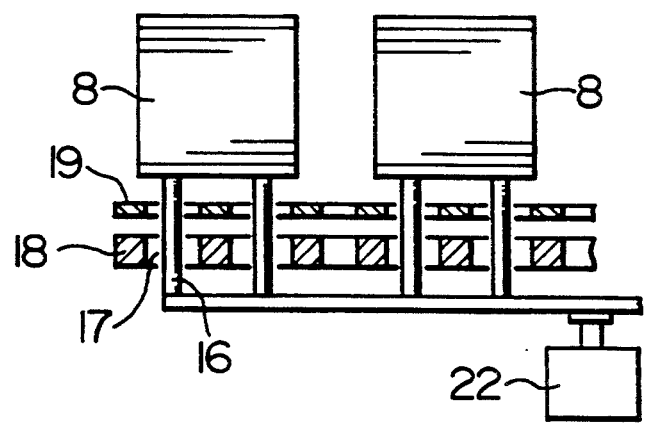
FIG. 7 illustrates a positional relations of a transferring mechanism for transferring stacks of plates.

FIG. 7 illustrates the positional relations among the components of the transfer means with respect to the flat board 18. A lifter 22 raises or lowers all the stays 16 at one time.

As described above, the individual component mechanisms of the apparatus of the present invention, as well as the combination thereof, contribute to improvements in the plate stacking and transferring processes. The combination of the mechanisms enables well-balanced handling of plates in accordance with high-speed production of plates. Thus, the mechanism according to the present invention significantly enhances the productivity of plates.

What is claimed is:

1. A plate stacking apparatus comprising:
   (a) a belt conveyor for continuously transporting a plurality of pasted plates:
   (b) plate ejecting means, provided at a leading end of said conveyor, for ejecting said plates approximately along a line extended from said conveyor;
   (c) a stacking device including:
   (i) a first stacker table for receiving and stacking said plates ejected by said plate ejecting means and descending in accordance with an amount of plates stacked thereon so as to produce a stack of plates thereon, and
   (ii) a second stacker table for associating with said first stacker table and receiving the stack of plates from said first stacker table when said first stacker table has descended to a predetermined position, and then descending while continuing to stack plates until a stack comprising a predetermined number of plates is stacked thereon, and then passing the stack comprising the predetermined number of plates over to a transferring unit provided under said second stacker table, said first stacker table and said second stacker table being able to ascend and descend; and a collision wall provided separately from said stacker tables and in a flight line of plates ejected from said plate ejecting means so as to stop plates ejected therefrom;

wherein said first stacker table has a stacker base formed in a shape of a fork, and stands by at such a position that said stacker base is a little above the flight line of plates ejected from said plate ejecting means, and descends from said position to such a position that said stacker base is below the flight line of plates within a time interval between plate ejections so as to start stacking plates.

2. A plate stacking apparatus according to claim 1, wherein a lower portion of an end portion of the stacker base formed in said shape of said fork is tapered.

3. A plate stacking apparatus according to claim 1, wherein said plate ejecting means comprises: a pair of upper and lower rollers for rotating and taking a plate in a gap therebetween in order to eject the plate; and an adjust device for varying positions of said rollers so as to adjust an ejection angle of the plate ejected from said rollers.

4. A plate stacking apparatus according to claim 3, wherein at least one of said pair of rollers is able to independently rotate.

* * * * *